United States Patent [19]

Egger et al.

[11] Patent Number: 4,462,719

[45] Date of Patent: Jul. 31, 1984

[54] CONCRETE GUN

[75] Inventors: Hans R. Egger, Zumikon; Rudolf Vogler, Zürich, both of Switzerland

[73] Assignee: Intradym Maschinen AG, Winterthur, Switzerland

[21] Appl. No.: 381,507

[22] Filed: May 24, 1982

[30] Foreign Application Priority Data

May 27, 1981 [CH] Switzerland .............. 3467/81

[51] Int. Cl.³ .............................. B65G 53/46
[52] U.S. Cl. ........................... 406/64; 222/148; 222/442
[58] Field of Search ................ 406/63, 64; 414/220; 239/115–117, 123; 222/148, 442

[56] References Cited

U.S. PATENT DOCUMENTS 4,376,600  3/1983  Egli ................................. 406/64 X

*Primary Examiner*—Jeffrey V. Nase
*Attorney, Agent, or Firm*—Cushman, Darby & Cushman

[57] ABSTRACT

A concrete gun comprising in combination a rotor, a plurality of chambers arranged in said rotor in a circular array and extending parallel to the axis of said rotor, sealing plates of elastomeric material engaging the ends of the rotor and closing said chambers, a vent orifice comprising a recess in one of said sealing plates, said recess being located to be successively in register with said chambers upon rotation of said rotor, an air filter communicating said recess with the surrounding air and a clearing device for the recess including an actuating element extending from the recess to outside the gun. By reason of the external actuating element the vent orifice can be periodically cleaned of deposited residue without danger or having to shut down the machine.

10 Claims, 3 Drawing Figures

CONCRETE GUN

DESCRIPTION

The invention relates to a concrete gun, that is a gun for directing concrete, of the type having chambers arranged in a circular array in a rotor. The chambers are filled in succession with a concrete mixture for instance from a hopper. The mixture is then blown out of the chambers by means of compressed air at a particular rotational position of the rotating rotor.

A compressed-air outflow opening and a material discharge opening are located axially opposite one another in sealing plates which close the chambers at each end. As each chamber rotates past these openings, however, after discharge of concrete, they still contain an undesirable excess pressure, so that the air still present in the chamber has to be discharged into the open air. For this purpose, it is known to provide in the upper sealing plate a radial recess which opens into a gap bounded by a dust shield surrounding the rotor. There is a path from this gap to an air filter and from the latter into the open air.

The air filter is necessary since the air vented from the chamber carries with it residues of the concrete mixture, especially dust, and these residues of material have to pass through the recess in the sealing plate. Since the height of this recess is limited by the thickness of the sealing plate, it represents a bottleneck for the escaping air and therefore tends to become blocked by the residues. It is consequently necessary, from time to time, to clear the accumulated residues of material from the recess. To make it easier to carry out this work, which must be done by hand, the dust shield is subdivided into an upper part and a lower part. The outlet with the air filter is located in the lower part of the dust shield, so that the upper part can be opened unimpeded so as to remove the residues of material from the recess.

A disadvantage of this known arrangement is that the cleaning work usually makes it necessary to interrupt the operation of the machine. While it is possible to perform the cleaning while the machine is running, there is then a danger of accident, firstly because the rotor is running and secondly because the residues continue to be expelled and a considerable amount of dust is generated precisely at that point where the cleaning work has to be done.

The object of the present invention therefore is to provide a concrete gun which can be cleaned in operation so that the danger of obstruction of the venting channels can be eliminated without danger or a need to shut down the concrete gun.

According to the present invention there is provided a concrete gun comprising in combination a rotor, a plurality of chambers arranged in said rotor in a circular array and extending parallel to the axis of said rotor, sealing plates of elastomeric material engaging the ends of the rotor and closing said chambers, a vent orifice comprising a recess in one of said sealing plates, said recess being located to be successively in register with said chambers upon rotation of said rotor, an air filter communicating said recess with the surrounding air and a clearing device for the recess including an actuating element extending from the recess to outside the gun.

The provision of a clearing device which is operable from outside the concrete gun by means of an actuating element makes it possible, during operation, to loosen residues of material accumulated in the recess. Accordingly, these residues can be carried along with the outflowing air to be collected in the air filter, which can be located on the outside of the machine and consequently be easily accessible. Occasional actuation of the clearing device can readily be performed by an attendant and requires no interruption of operation, so that the clearing device contributes substantially to fault-free operation of the concrete gun.

Preferably the actuating element is guided in the clamping plate, as such a design requires only a few additional constructional elements and allows easy access for the attendant. Preferably also the clearing device has a flexible lamella extending over the recess in the sealing plate, essentially in the direction of flow of the escaping air, and the lamella can be made integral with the sealing plate. Designs of this type make it possible to break off a layer of material adhering to the lamella, and make assembly easy since the lamella does not need to be fitted separately.

Preferably also the lamella has a dish-shaped bulge, which makes it easier to actuate. When the clearing device is activated the bulge only needs to be pressed inwards in order to break off adhering residue. The bulge of the lamella can be located in a depression in the clamping plate which holds the sealing plate with the recess against the rotor. This allows the outlet cross-section to be enlarged and be bounded less narrowly in the event that the thickness of the sealing plate lessens as a result of wear. If as is preferred the lamella spans the entire recess in the sealing plate it assists in sealing off the device from the outside, so as to prevent escape of air and local dust pollution.

In one advantageous embodiment of the invention the actuating element has an arm radially displaceable so as to force the lamella out of the depression in the clamping plate when the actuating element is actuated. The advantage of this is that no additional space is taken up by the actuating element and the danger of contact with the running rotor is removed. The lamella can additionally form, at its radially outer edge, a continuation of a peripheral sealing lip provided on the sealing plate. A dust shield surrounding the rotor can fit over this lip against the clamping plate. In this way, the sealing plate, together with the lamella, acts as a seal for the dust shield.

Preferably there is an outlet passing through the dust shield at a point located radially opposite the recess and leading to the air filter. This means that vented air can pass straight out without being deflected.

In order that the invention may be more clearly understood, the following description is given by way of example only with reference to the accompanying drawings in which.

Figure 1:
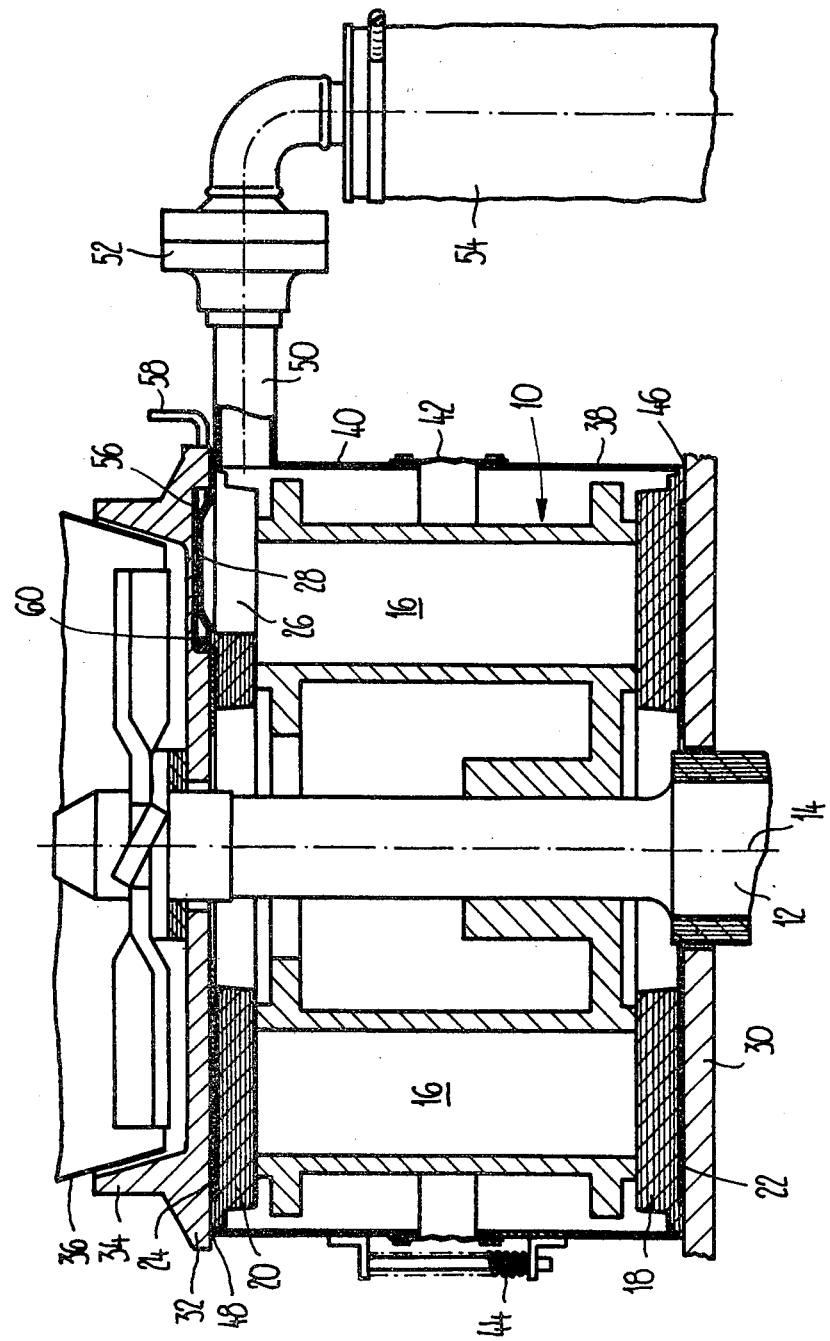
FIG. 1 shows an axial section through the rotor and the adjoining parts of a concrete gun.

FIG. 1 shows a rotor 10, which is rotationally fixed to a vertically arranged shaft 12. Extending through the rotor are chambers 16 which are arranged around the axis of rotation 14. A lower sealing plate 18 and an upper sealing plate 20 close the ends of these chambers 16, and define a material feed opening, a material discharge opening and a compressed air inlet opening, such openings being not shown. The two sealing plates 18 and 20 consist of an elastomeric material and are vulcanized onto respective metallic support plates 22 and 24.

In addition to the openings just mentioned the upper sealing plate 20 also has a recess 26. The recess 26 is covered by a flexible lamella 28, which extends above but is integral with the upper sealing plate 20.

The lower sealing plate 18 rests with its metallic plate 22 on a base plate 30. The upper sealing plate 20 is pressed by means of its metallic plate 24 against the rotor 10 by a clamping plate 32, so as to provide adequate sealing of the chambers 16 at both ends. The rotor 10 is axially displaceable on the shaft 12 which can be, for example, a square shaft, so that a clamping force of the clamping plate 32 applies pressure on both the lower and upper sealing plates 18 and 20. The clamping plate 32 has an upwardly extending edge 34 to receive a partly shown hopper 36.

During operation, the two sealing plates 18 and 20 are subjected to wear by the rotating rotor 10 and the usually dry concrete mixture conveyed in the chambers 16. However, the sealing plates 18 and 20 can be used several times by means of renewed face-grinding. The decreasing thickness of the two sealing plates is compensated by readjusting the clamping plate 32.

The rotor 10 is surrounded by a fixed dust shield consisting of two sheet-metal cylinders 38 and 40, which are arranged above one another and which are connected to one another in an air-tight manner by a bellows-like rubber cylinder 42. Four springs 44, offset 90° relative to one another, push the sheet-metal cylinders 38 and 40 away from one another and press them against lower and upper sealing lips (46, 48) respectively, these being provided integrally on the lower and upper sealing plates 18 and 20. The bellows-like rubber cylinder 42 serves not only as a dust shield but also for compensating for changes in the distance between the base plate 30 and the clamping plate 32, this distance varying as a result of grinding of the sealing plates 18 and 20.

Extending radially from the upper sheet-metal cylinder 40 is an outlet nozzle 50, to which an air filter 54 is connected via a coupling 52. The air filter 54 can be, for example, a filter bag.

Figure 2:
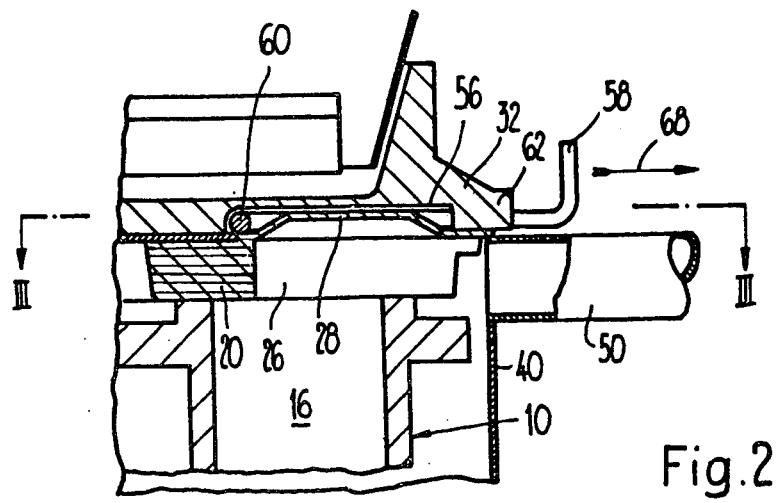
FIG. 2 shows the outlet opening of the concrete gun in an enlarged partial view of the section of FIG. 1.

FIG. 2 shows part of FIG. 1 on an enlarged scale. It is evident from this Figure that the lamella 28 having a dish-shaped bulge is located in a depression 56 provided in the clamping plate 32. An actuating element 58 is displaceably arranged in the clamping plate 32, and extends radially to the depression 56. The actuating element 58 has an arm 60 at right angles to its actuating, radial direction.

Figure 3:
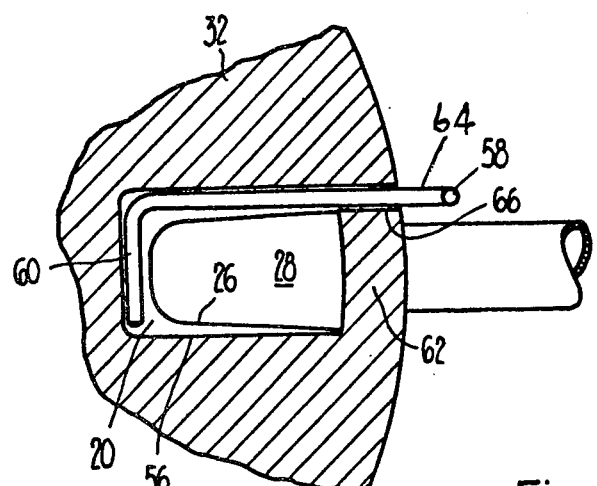
FIG. 3 shows a sectional view along the line III—III of FIG. 2.

As shown in FIG. 3, the arm 60 extends over the width of the depression 56. The depression 56 approximately corresponds, when seen from above, to a rectangle which extends radially up to an outer edge region 62. A longitudinal member 64 of the actuating element 58 is guided in a bore 66, which passes through the outer edge region 62.

It is also evident from FIG. 3 that the lamella 28 spans the recess 26 in the upper sealing plate 20. The width of the depression 56 provided in the clamping plate 32 is such that it corresponds approximately to the largest width of the lamella 28 plus the diameter of the longitudinal member 64 of the actuating element 58, so that the longitudinal member 64 and the lamella 28 bulging into the depression 56 fill the width of the depression 56. The recess 26 in the upper sealing plate 20 is approximately bell-shaped, with its part of largest width being radially outermost. It can be seen from FIGS. 2 and 3 that, when the actuating element 58 is pulled out in the direction of the arrow 68, the arm 60 forces the lamella 28 out of the depression 56, and this movement serves to detach residues of material which may have attached themselves to the lamella 28.

The bulge of the lamella 28 projects in a radial direction beyond the upper outer edge of the rotor 10, so that a gap remains above the outer rotor edge as an outlet opening even when the upper sealing plate 20 has reduced thickness as result of wear.

Since the outer edges of the two sealing plates 18 and 20 each have a sealing lip 46 and 48, there is no need for separate sealing elements for sealing off the dust shield which consists of the parts 38, 40 and 42. The radially outer edge of the lamella 28 forms a continuation of the sealing lip 48.

The arrangement of the outlet nozzle 50 radially aligned with the recess 26 means that the escaping air stream travels straight and is not deflected as is the case in known constructions, in which the outlet nozzle is located in the lower sheet-metal cylinder 38 in order to make it possible to remove the upper sheet-metal cylinder 40 for cleaning the recess 26.

The provision of the bulging flexible lamella 28 in the depression 56 is in effect a lining of the depression. The lamella 28, together with the arm 60 of the actuating element 58, forms the clearing device which serves for clearing out the recess 26, and allows this operation to be performed during continued operation of the concrete gun. There is no need to open the dust shield.

We claim:

1. A concrete gun comprising in combination a rotor, a plurality of chambers arranged in said rotor in a circular array and extending parallel to the axis of said rotor, sealing plates of elastomeric material engaging the ends of the rotor and closing said chambers, a vent orifice comprising a recess in one of said sealing plates, said recess being located to be successively in register with said chambers upon rotation of said rotor, an air filter communicating said recess with the surrounding air and a clearing device for the recess including an actuating element extending from the recess to outside the gun.

2. A concrete gun as claimed in claim 1, including a guide in the clamping plate for the actuating element.

3. A concrete gun as claimed in claim 1, wherein the clearing device includes a flexible lamella extending over the recess.

4. A concrete gun as claimed in claim 3, wherein the lamella is integral with said one sealing plate.

5. A concrete gun as claimed in claim 3, wherein the lamella has a dish-like bulge.

6. A concrete gun as claimed in claim 5, including a clamping plate holding said one sealing plate against the rotor and wherein the bulge of the lamella is located in a depression in said clamping plate.

7. A concrete gun as claimed in claim 6, wherein the lamella spans the entire area of the recess.

8. A concrete gun as claimed in claim 6, including an arm of the actuating element, said arm being displaceable in said depression in a direction radial of the axis of the rotor, so that the actuating element forces the lamella out of the depression when actuated.

9. A concrete gun as claimed in claim 7, including a sealing lip on the periphery of said one sealing plate and a dust shield surrounding the rotor and fitting against the clamping plate, and wherein a radially outer edge of the lamella forms a continuation of said sealing lip.

10. A concrete gun as claimed in claim 9, including an outlet passing through the dust shield at a point located radially opposite the recess and leading to the air filter.

* * * * *